US005592236A

United States Patent [19]
Rosenbaum et al.

[11] Patent Number: 5,592,236
[45] Date of Patent: Jan. 7, 1997

[54] METHOD AND APPARATUS FOR OVERLAYING TWO VIDEO SIGNALS USING AN INPUT-LOCK

[75] Inventors: Fred Rosenbaum, Austin, Tex.; Paul S. Yosim, Superior, Colo.

[73] Assignee: International Business Machines Corporation, Armonk, N.Y.

[21] Appl. No.: 457,560

[22] Filed: Jun. 1, 1995

[51] Int. Cl.⁶ .................................................. H04N 9/74
[52] U.S. Cl. .......................... 348/586; 348/587; 345/114
[58] Field of Search .......................... 348/587, 590–592, 348/586, 588, 598, 593, 584; 345/113, 114; H04N 9/74, 9/75

[56] References Cited

U.S. PATENT DOCUMENTS

| | | |
|---|---|---|
| 4,621,280 | 11/1986 | Shinohara et al. . |
| 4,680,622 | 7/1987 | Barnes et al. . |
| 4,949,165 | 8/1990 | Rienann et al. . |
| 4,954,970 | 9/1990 | Walker et al. . |
| 4,982,343 | 1/1991 | Hourvitz et al. . |
| 5,003,491 | 3/1991 | Heckt . |
| 5,008,754 | 4/1991 | Trevett et al. . |
| 5,065,143 | 11/1991 | Greaves et al. . |
| 5,070,397 | 12/1991 | Weddurburn-Bisshop . |
| 5,081,522 | 1/1992 | Hiroyuki . |
| 5,115,314 | 5/1992 | Ross et al. . |
| 5,121,210 | 6/1992 | Hirayama . |
| 5,309,238 | 5/1994 | Bae ......................................... 348/588 |
| 5,398,075 | 3/1995 | Freytag et al. ........................... 348/587 |

*Primary Examiner*—Micheal H. Lee
*Attorney, Agent, or Firm*—Anthony N. Magistrale

[57] ABSTRACT

Disclosed is a method and apparatus for combining first and second video signals to produce a composite video signal for display. First and second video sources generate first and second video signals. A chroma key circuit is included for comparing each pixel of the first video signal with a preselected color and generating logic signals indicating whether or not each pixel matches the preselected color. An input lock map stores each of the logic signals when field data is in a first state and provides the logic signals on an output line thereof when the field data is in a second state. A frame buffer selectively receives (1) a complement of the logic signals when the field data is in the first state and (2) the logic signals when the field data is in the second state. The frame buffer is operative to store the composite video signal which is comprised of (1) a plurality of selected pixels from the first video signal which have corresponding logic signals that indicate they do not match the preselected color and (2) a plurality of selected pixels from the second video signal which have corresponding logic signals that indicate they correspond to pixel locations of the first video signal which matched the preselected color.

27 Claims, 2 Drawing Sheets

METHOD AND APPARATUS FOR OVERLAYING TWO VIDEO SIGNALS USING AN INPUT-LOCK

BACKGROUND OF THE INVENTION

1. Field of the Invention

The present invention relates generally to composite video systems and more particularly, to a method and apparatus for combining first and second video signals using an input lock map and one frame buffer to produce a composite video signal for display.

2. Description of Related Art

Chroma key is a mechanism long used by the studio television industry to isolate a desired portion of a live image. It is based on the notion of artificially constraining the colors in a scene so that a different set of colors occur inside a set of objects than in the background behind the set of objects. Typically, a saturated blue color is used as a backdrop in front of which objects are placed, since most natural objects do not contain saturated blue color.

A TV camera views the scene. The color components of the video signal from the TV camera are digitized and compared on a pixel by pixel basis to determine if the pixel's color falls within the region of the saturated blue color. For example, if the component colors are red, green and blue, a pixel that met the criteria would simultaneously have a small value for red, a small value for green, and a large value for blue. The result of this comparison generates a logical output which indicates whether the pixel belongs to the object or the background.

The intention is to replace those pixels belonging to the background with spatially corresponding pixels from another video source. Therefore, the logical output, referred to as a chroma key, can be used to select or key which of two live inputs is to be multilplexed on a pixel basis to the video output for display. What results is a composite image made up of a background scene from one video source with a live object from another video source being overlayed on top of it. For example, one pre-recorded video source might show the approaching ground filmed by a free fall parachutist. The other video source might be a TV camera pointed at a person sitting on a prop bomb in front of a blue backdrop. The composite chroma keyed output would show a person riding a bomb in free-fall towards the earth below.

This form of chroma key use for video overlaying video should not be confused with the more common video overlaying graphics form of chroma keying which only places a live video into a static window of a predefined shape.

If the video over video chroma key function is to be performed in front of a digital frame buffer, then one approach is to use two video digitizers and two digital frame buffers, with each of the digitizers consisting of a video decoder and a video rate analog to digital converter, to simultaneously process the two video sources so that they could be multiplexed into the digital frame buffers. However, there are many instances where video over video is not a sufficiently important feature to justify the expense of two video digitizers and two frame buffers. Examples of such instances include, personal computers and any video devices not involved in professional video productions. Accordingly, there is a desire to develop an overlaying two video signal system which does not require two costly video digitizers or two costly frame buffers.

SUMMARY OF THE INVENTION

The present invention is directed to a method and apparatus for combining first and second video signals to produce a composite video signal for display. In one embodiment of the present invention a first video source is provided for generating a first analog video signal for each of a first plurality of pixels. A second video source is also included for generating a second analog video signal for each of a second plurality of pixels. The first analog video signals can represent an object in front of a blue screen while the second analog video signals can represent a background image. The video image from the first video source will be super imposed on the background image from the second video source to provide a composite video image for display.

A first selector is provided for selectively connecting the first or second video sources to a digitizer based on field data. The digitizer converts the analog video signals from each of the sources to digital video data and provides the digital video data to a frame buffer. A chroma key circuit compares each pixel of data output from the digitizer with a selected color and outputs a logic one when the color of the pixel matches a selected color (e.g., blue). For all other colors the chroma key circuit outputs a logic zero. The output from the chroma key circuit is input to an inverter and an input lock map. A second selector is used to selectively provide logic signals from the inverter or input lock map to a write control line (WR) connected to the frame buffer.

In operation, on a pixel by pixel basis for even numbered fields the first analog video signals are passed through the first selector and converted to a first digital video signal by the digitizer. The first digital video signals are then examined by the chroma key circuit. At the same time, the first digital video signal is presented to the frame buffer. If the blue background color was not detected, the inverted output of the chroma key circuit (logic one) is provided by the second selector to the WR line causing the object digital data from the first digital video signal to be stored in the frame buffer. If the blue background color was detected, the inverted output of the chroma-key circuit (logic zero) is provided by the second selector to the WR line preventing the blue digital data from being stored in the frame buffer.

At the same time that each pixel is being processed by the digitizer, the chroma key circuit, frame buffer, inverter and the second selector, the output of the chroma key circuit for each pixel is being stored in the input lock map. The input lock map will thus contain a map of which pixel locations belong to the object and which belong to the blue background.

Next, on a pixel by pixel basis for odd numbered fields the second analog video signals are passed through the first selector, converted to second digital video signals by the digitizer and then presented to the frame buffer. At the same time the same address corresponding to the pixel being processed is read from the input lock map. If this address location in the input lock map contains a logic one, the background is needed for this location and the second selector will provide the logic one to the WR line. The digital background data from the second digital video signal will then be stored in the frame buffer. If the address location in the input lock map contained a logic zero indicating that the background is not needed for this location, the second selector will provide the logic zero to the WR line. Accordingly, the digital data from the second digital video signal for this location will not be stored in the frame buffer and the object data stored in this location during even field processing will remain.

Once all even and odd numbered pixel locations have been processed, the data stored in the frame buffer can be read by display controller circuitry which will display an image representing the composite image of the object and background video data supplied by the first and second video sources respectively.

Another embodiment of the present invention is directed to a method and apparatus for combining a first analog video signal and a second digital video signal to produce a composite video signal for display. This embodiment includes a first video source for generating the first analog video signal for each of a plurality of pixels. A second video source is included for generating a second digital video signal for each of a plurality of pixels. The analog video signals can represent an object in front of a blue screen while the digital video signals can represent a background image. The video image from the first video source will be super imposed on the background image from the second video source to provide a composite video image for display.

The first video source is coupled to a digitizer for converting the first analog video signals into first digital video signals. A first selector is provided for sending the first or second digital video signals to a frame buffer based on field data. A chroma key circuit compares each pixel of data output from the digitizer with a selected color and outputs a logic one when the color of the pixel matches a selected color (e.g., blue). For all other colors the chroma key circuit outputs a logic zero. The output from the chroma-key circuit is input to an inverter and an input lock map. A second selector is used to selectively provide logic signals from the inverter or input lock map to a write control line (WR) coupled to the frame buffer.

In operation, on a pixel by pixel basis for even numbered fields the first analog video signals are converted to first digital video signals by the digitizer. The first digital video signals are then examined by the chroma key circuit. At the same time, the first digital video signal is presented to the frame buffer. If the blue background color was not detected, the inverted output of chroma key circuit (logic one) is provided by the second selector to the WR line causing the object digital data from the first digital video signal to be stored in the frame buffer. If the blue background color was detected, the inverted output of the chroma key circuit (logic zero) is provided by the second selector to the WR line preventing the blue digital data from being stored in the frame buffer.

At the same time that each pixel is being processed by the digitizer, the chroma key circuit, frame buffer, inverter and the second selector, the output of the chroma key circuit for each pixel is being stored in the input lock map. The input lock map will thus contain a map of which pixel locations belong to the object and which belong to the blue background.

Next, on a pixel by pixel basis for odd numbered fields the second digital video signals are provided by the first selector to the frame buffer. At the same time the same address corresponding to the pixel being processed is read from the input lock map. If this address location in the input lock map contains a logic one, the background is needed for this location and the second selector will provide the logic one to the WR line. The digital background data from the second digital video signal will then be stored in the frame buffer. If the address location in the input lock map contained a logic zero indicating that the background is not needed for this location, the second selector will provide the logic zero to the WR line. Accordingly, the digital data from the second digital video signal for this location will not be stored in the frame buffer and the object data stored in this location during even field processing will remain.

Once all even and odd numbered pixel locations have been processed, the data stored in the frame buffer can be read by display controller circuitry which will display an image representing the composite image of the object and background video data supplied by the first and second video sources respectively.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with aspects of video overlaying and chroma keying.

Figure 1:
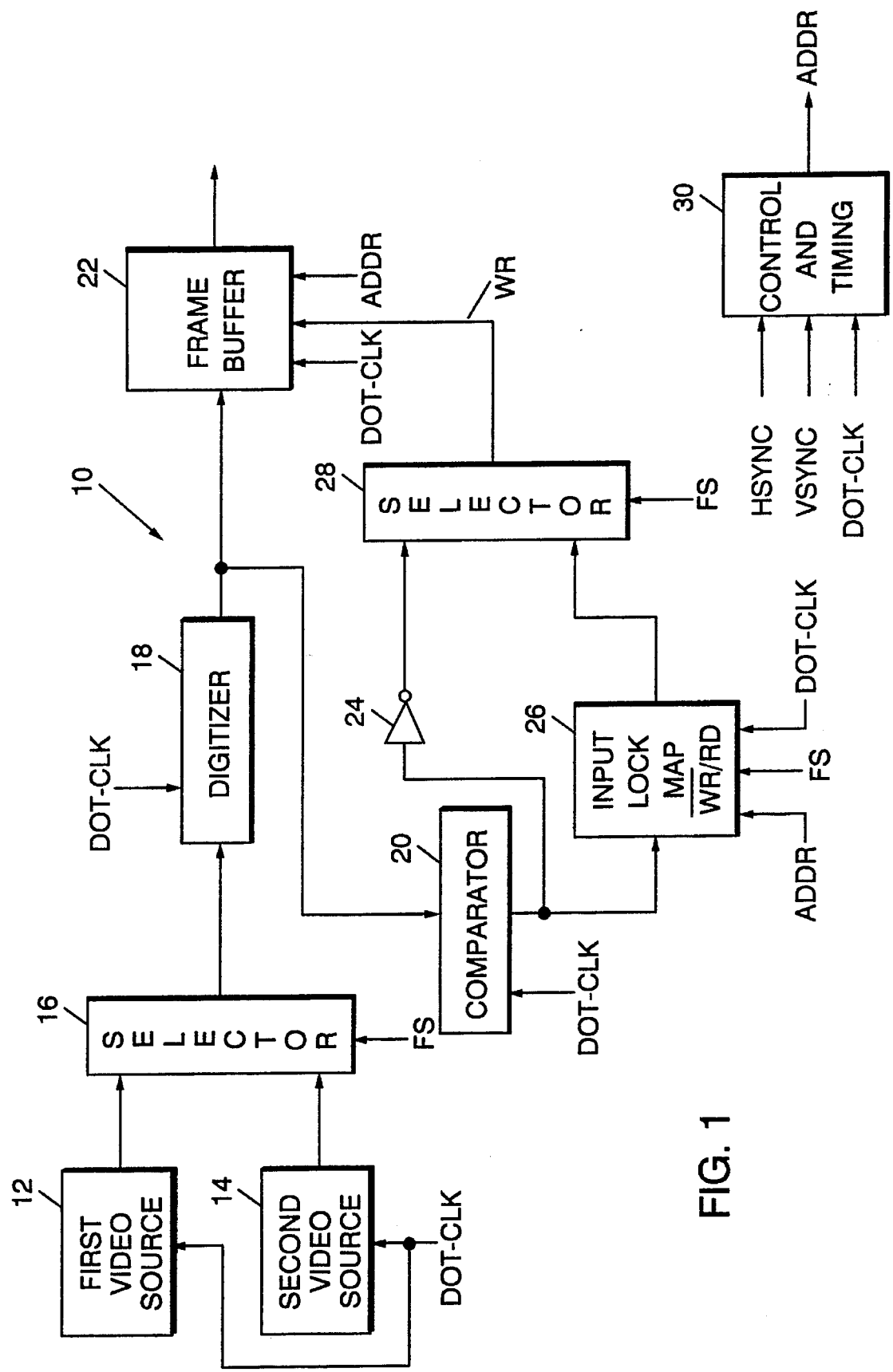
FIG. 1 is a block diagram of one embodiment of the overlaying two video signal system of the present invention.

Referring now to FIG. 1, there is shown a block diagram of one embodiment of the overlaying two video system 10 of the present invention. The system 10 includes a first video source 12 that can generate an analog video stream for each of a first plurality of pixels that contain video data (object signals) in front of a blue screen. The image that appears in front of the blue background can be displayed on a screen (not shown). A second video source 14 is also included and it can generate an analog video stream for a second plurality of pixels. However, the video stream of video source 14 contains data that represents a background image (background signals). As will be described in more detail below the image from the first video source 12 will be super imposed on the background image from the second video source 14 and displayed on a screen. The first and second video sources 12, 14 can be any sources that can generate live analog video signals for each of the first and second plurality of pixels respectively, such as for example, a camera, a video cassette recorder (VCR) or any TV tuner.

The first and second video sources 12 and 14 are connected to a selector 16. The selector 16 is a well known analog circuit that selects between the first and second analog video signals provided by the first and second video sources 12, 14 respectively based on a field select bit (FS). The output of selector 16 is the analog video data from the first video source 12 if FS is a logic zero which represents all even numbered fields including zero and the analog video data from the second video source 14 if FS is a logic one which represents all odd numbered fields.

The output of selector 16 is applied to a digitizer 18 which converts the analog video signals from selector 16 to digital video data. The digitizer 18 is a well known device and it includes a video rate analog to digital converter and may include a video decoder. The digital video signals output from digitizer 18 is input to a comparator 20 and a frame buffer 22. The comparator 20 is a chroma key circuit and it outputs a logic one when the color of the digital video data output from digitizer 18 matches a selected color (e.g., blue). For all other colors the comparator 20 outputs a logic zero.

The output from comparator 20 is input to an inverter 24 and an input lock map 26. Input lock map 26 is a memory unit that contains at least 1 bit for each pixel location on the screen map. For example, a VGA display of 640×480 will have at least 640×480=307,200 bits and an XGA display of 1024×768 will have at least 786,432 bits.

A selector 28 selects between the inverted output of comparator 20 and the output of input lock map 26 based on the FS bit. The output of selector 28 is the inverted output of comparator 20 for all even numbered fields (FS=0) and the output of input lock map 26 for all odd numbered fields (FS=1).

The frame buffer 22 is coupled to digitizer 18 and is a storage unit that contains a complete video frame to be displayed. This can be made from dual ported random access memory (RAM), video RAM (VRAM), or any appropriate storage device. The data to be displayed must be able to be read independently of data being written. The logic signal passed through selector 28 is placed on a write control line (WR) which controls a write select bit in the frame buffer 22. When the signal on WR is a logic one the digital video signal (pixel) supplied by digitizer 18 is stored in frame buffer 22. On the other hand if the signal on WR is a logic zero the digital video pixel data supplied by digitizer 18 is not stored in frame buffer 22.

The overlaying two video signal system 10 further includes control and timing circuits 30 which are well known in the art and are used to control the pixels being delivered from the first and second video sources 12, 14 and addressing where in the input lock map 26 and the frame buffer 22 the pixel data is stored. Circuit 30 receives horizontal and vertical synchronization signals HSYNC and VSYNC respectively and generates as address ADDR corresponding to the pixel location to be processed. This address is input to the frame buffer 22 and the input lock map 26. A DOT-CLK signal from a pixel clock (not shown) is coupled to the first and second video sources 12, 14, the digitizer 18, the chroma key circuit 20, the frame buffer 22, the input lock map 26 and circuit 30 for controlling the timing of the pixel processing by system 10.

The operation of the system 10 will now be described and for illustrative purposes only, the live analog video signal from the first source 12 will contain object video data in front of a blue background and the live analog video signal from the second source 14 will contain background video data. (It should be noted that any color can be used instead of blue if desired and only comparator 20 needs to change. In addition, the first analog video source 12 can supply the background signals while the second analog video source 14 can supply the object signals.)

In operation, on a pixel by pixel basis (e.g., 1024 times per line for 768 lines on an XGA display), for even numbered fields (FS=0) the object analog video signal from the first analog video source 12 is passed through selector 16 and then converted by digitizer 18 into a first digital video signal. Each pixel of the first digital video signal is then examined by the comparator 20 and compared to the blue background color. At the same time, the first digital video signal is presented to the frame buffer 22.

If the blue background color was not detected for the particular pixel being examined (i.e., the pixel is part of the object), the output of chroma key circuit 20 is a logic zero, which is inverted to a logic one by inverter 24. The logic one is then passed through selector 28 and onto the WR line connected to the frame buffer 22. The logic one on the WR line causes the pixel being examined to be stored in the frame buffer 22. If the blue background color was detected, the output of comparator 20 is a logic one, which is inverted to a logic zero by inverter 24. The logic zero passes through selector 28 and is provided on the WR line. The logic zero on the WR line prevents the blue pixel data from the first video source 12 from being stored in frame buffer 22.

At the same time that each pixel is being processed by circuits 18, 20, 24, 22, 28 and 30 the output of comparator 20 for each pixel is being stored in input lock 26. For those pixels associated with the object, the comparator 20 outputs a signal (e.g., logic zero) that sets the corresponding bits in the input lock map 26. For those pixels associated with the background, the chroma key circuit 20 outputs a signal (e.g., logic one) that clears the corresponding bits in the input lock map 26.

After all of the first plurality of pixels from the first video source 12 are processed, the apparatus 10 will process the second plurality of pixels from the second source 14. On a pixel by pixel basis (e.g., 1024 times per line for 768 lines on an XGA display), for odd numbered fields (FS=1) the background analog video signal from the second analog video source 14 is passed through selector 16, converted to a second digital video signal by digitizer 18 and then presented to the frame buffer 22. At the same time the same address corresponding to the pixel being processed is read from the input lock map 26. If this address location in input lock map 26 contains a logic one, the background is needed for this location and the input lock map 26 will pass the logic one through selector 28 to the WR line. This will cause the background digital pixel being processed to be stored in the frame buffer 22. If the address location in the input lock map 26 contained a logic zero indicating that the background is not needed for this location, the input lock map 26 will pass the logic zero through selector 28 to the WR line. Accordingly, this digital pixel from the second digital video signal for this location will not be stored in frame buffer 22 and the object data stored in this location during even field processing will remain.

The input lock map 26 is thus used as a field memory to save the pixel status from one field for use in the next field. The frame buffer 22 is filled with the objects from the first field video source 12 overlaying the background scene from the second field video source 14.

Once all even and odd numbered pixel locations have been processed by the system 10, the frame buffer 22 will contain a composite video signal which is comprised of (1) a plurality of selected pixels from the first video signal which have corresponding logic signals that indicate they do not match the preselected color and (2) a plurality of selected pixels from the second video signal which have corresponding logic signals that indicate they correspond to pixel locations of the first video signal which matched the preselected color. The composite video signal stored in the frame buffer 22 can be read by display controller circuitry (not shown) which will display the composite image of the object and background video data supplied by the first and second video sources 12 and 14 respectively.

In summary, for even numbered fields, live analog video data in the form of an object in front of a blue background supplied from the first source 12 will be digitized and only the digital object data will be stored in frame buffer 22 regardless of status of the input lock map 26. In addition, the input lock map 26 will contain a pixel map of exactly which pixel locations are associated with the object and which are associated with the blue background. For odd numbered fields, the second analog video signal in the form of a background supplied from the second source 14 will be converted to the second digital video signal by digitizer 18 and only those pixels of the second digital video signal (background) which correspond to the blue background locations of the first video source 41 will be stored in the frame buffer 22. The determination of which pixels from the background source 14 correspond to the blue background supplied from the first source 12 is based solely on the status of the bits in the input lock map 26. Once all even and odd numbered pixel locations have been processed by the system 10, the composite image of the object and background video data can be read from frame buffer 22 and displayed.

The overlaying two video signal system 10 thus provides a substantial cost reduction in that it can combine two analog video signals supplied from two analog video sources 12, 14 into a composite digital signal utilizing only one costly digitizer 18 and a single costly frame buffer 22.

Figure 2:
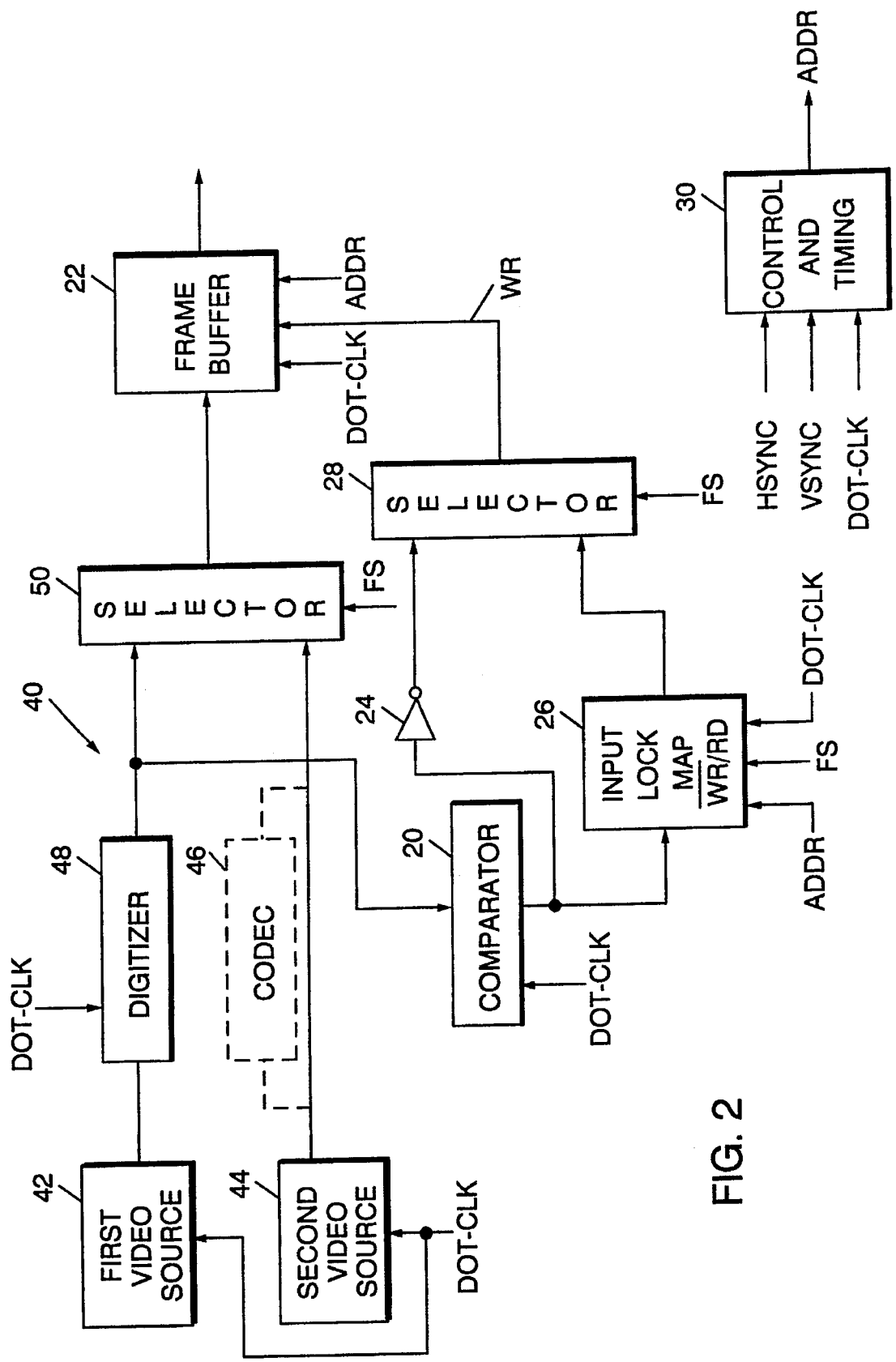
FIG. 2 is a block diagram of a second embodiment of the overlaying two video signal system of the present invention.

Turning now to FIG. 2, there is shown a block diagram of another embodiment of the overlaying two video system of the present invention. Elements which are in FIG. 2 and are the same as and operate in the same manner have been labeled with the same numeral. The system 40 can be utilized when live analog video data is provided from one video source while digital video data (live or stored) is provided from a second video source. More specifically, the system 40 includes a first video source 42 which can generate a first analog video signal for each of a first plurality of pixels. The first analog video signal can contain video data (object signals) in front of a blue screen. The image that appears in front of the blue background can be displayed on a screen (not shown). A second video source 44 is also included and it can generate a second digital video signal for each of a second plurality of pixels. However, the second digital video stream of video source 44 contains data that represents a background image (background signals). As will be described in more detail below the image from the first video source 42 will be super imposed on the background image from the second video source 44 and displayed on a screen.

The first video source 42 can be any video source that can generate a live analog video signal such as for example, a camera, VCR or TV tuner. The second video source 44 can be any video source that can provide a stored (pre-recorded) digital video signal (e.g., computer hardfile or CD ROM) or a live digital video signal (e.g., a digital camera or satellite camera). Alternatively, the second source 44 can be a compressed digital video source coupled to a compressor/decompressor (CODEC) 46 as shown by the dashed lines. The CODEC 46 can receive digital video signals (e.g., a video clip that has previously been authored and compressed for efficient storage) from a compressed video source (e.g., computer hardfile, CD ROM, digital camera or satellite camera) and decompress these signals in digital form.

The first video source 42 is coupled to a digitizer 48 for converting the first analog video signals from source 42 to a first digital video signal. The digitizer 48 and the second source 44 are connected to a selector 50. The output of selector 50 is the converted first digital video data from the first video source 42 if FS is a logic zero (all even numbered fields including zero) or the second digital video signal from the second video source 44 if FS is a logic one (all odd numbered fields).

The digital video data output of selector 50 is input to the frame buffer 22. The first digital video signal converted from the first video source 42 is input to comparator 20. The comparator 20 is the chroma key circuit and it outputs a logic one when the color of the digital video data output from digitizer 48 matches a selected color (e.g., blue). For all other colors the comparator 20 outputs a logic zero.

The output from comparator 20 is input to an inverter 24 and an input lock map 26. Input lock map 26 is a memory unit that contains at least 1 bit for each pixel location on the screen map. For example, a VGA display of 640×480 will have at least 640×480=307,200 bits and an XGA display of 1024×768 will have at least 786,432 bits.

A selector 28 selects between the inverted output of comparator 20 and the output of input lock map 26. The output of selector 28 is the inverted output of comparator 20 for all even numbered fields including zero (FS=0) and the output of input lock map 26 for all odd numbered fields (FS=1).

The frame buffer 22 is coupled to the output of selectors 50 and 28. The logic signal selected by selector 28 is placed on a write control line (WR) which controls a write select bit in the frame buffer 22. When the signal on WR is a logic one the digital video signal (pixel) supplied by selector 50 is stored in frame buffer 22. On the other hand if the signal on WR is a logic zero the digital video data supplied by selector 50 is not stored in frame buffer 22.

The overlaying two video system 40 further includes control and timing circuits 30 (described above with reference to FIG. 1) which are well known in the art and are used to control the pixels being delivered from the first and second video sources 42, 44 and addressing where in the input lock map 26 and the frame buffer 22 the pixel data is stored.

The operation of the system 40 will now be described and for illustrative purposes only, the live analog video signal from the first source 42 will contain object video data in front of a blue background and the second digital video signal from the second source 44 will contain background video data. (It should be noted that any color can be used instead of blue if desired and only comparator 20 needs to change. In addition, the first video source 42 can supply the background signals while the second video source 44 can supply the object signals.)

In operation, on a pixel by pixel basis (e.g., 1024 times per line for 768 lines on an XGA display), for even numbered fields (FS=0) the first analog video signal from the first video source 42 (object data) is converted to a first digital video signal by digitizer 48. The first digital video signal is then selected by selector 16 and then presented to the frame buffer 22. At the same time, each pixel of the first digital video signal from the digitizer 48 is examined by the comparator 20 and compared to the blue background color.

If the blue background color was not detected for the particular pixel being examined (i.e., the pixel is part of the object), the output of chroma key circuit 20 is a logic zero, which is inverted to a logic one by inverter 24. The logic one is then passed through selector 28 and onto the WR line causing the pixel being examined to be stored in the frame buffer 22. If the blue background color was detected, the output of comparator 20 is a logic one, which is inverted to a logic zero by inverter 24. The logic zero is passed through selector 28 and presented to the WR line. The logic zero on the Wr line prevents the blue pixel data from the first video source 42 from being stored in frame buffer 22.

At the same time that each pixel is being processed by circuits 20, 22, 26, 28 and 30 the output of comparator 20 for each pixel is being stored in input lock 26. For those pixels associated with the object, the comparator 20 outputs a signal (e.g., logic zero) that sets the corresponding bits in the input lock map 26. For those pixels associated with the background, the chroma key circuit 20 outputs a signal (e.g., logic one) that clears the corresponding bits in the input lock map 26.

After all of the first plurality of pixels from the first video source 42 are processed, the apparatus 40 will process the second plurality of pixels from the second source 44. On a pixel by pixel basis (e.g., 1024 times per line for 768 lines on an XGA display), for odd numbered fields (FS=1) the background digital video signal from the second video source 44 is passed through selector 50 and then presented to the frame buffer 22. At the same time the same address corresponding to the pixel being processed is read from the input look map 26. If this address location in input lock map 26 contains a logic one, the background is needed for this location and the input lock map 26 will pass the logic one through selector 28 to the WR line. The logic one on the WR line causes the background digital pixel being processed to be stored in the frame buffer 22. If the address location in the input lock map 26 contained a logic zero indicating that the background is not needed for this location, the input lock map 26 will pass the logic zero through selector 28 to the WR line. Accordingly, the digital pixel from the second digital video signal for this location will not be stored in frame buffer 22 and the object pixel stored in this location during even field processing will remain.

The input lock map 26 is thus used as a field memory to save the pixel status from one field for use in the next field. The frame buffer 22 is filled with the objects from the first field analog video source 42 overlaying the background scene from the second field digital video source 44.

Once all even and odd numbered pixel locations have been processed by the system 40, the frame buffer 22 will contain a composite video signal which is comprised of (1) a plurality of selected pixels from the first video signal which have corresponding logic signals that indicate they do not match the preselected color and (2) a plurality of selected pixels from the second video signal which have corresponding logic signals that indicate they correspond to pixel locations of the first video signal which matched the preselected color. The composite video signal stored in the frame buffer 22 can be read by display controller circuitry (not shown) which will display the composite image of the object and background video data supplied by the first and second video sources 42 and 44 respectively.

In summary, for even numbered fields, live analog video data in the form of an object in front of a blue background supplied from the first source 42 will be digitized by digitizer 48 and only the digital object data will be stored in frame buffer 22 irregardless of status of the input lock map 26. In addition, the input lock map 26 will contain a pixel map of exactly which pixel locations are associated with the object and which are associated with the blue background. For odd numbered fields, only those pixels of the second digital video signal (background) supplied from the second source 44 which correspond to the blue background locations of the first video source 42 will be stored in the frame buffer 22. The determination of which pixels from the background source 44 correspond to the blue background supplied from the first source 42 is based solely on the status of the bits in the input lock map 26. Once all even and odd numbered pixel locations have been processed by the system 10, the composite image of the object and background video data can be read from frame buffer 22 and displayed.

The overlaying two video signal system 40 thus provides a substantial cost reduction in that it can combine an analog video signal supplied from an analog video source 42 with a digital video signal supplied from a stored digital video source 44 into a composite digital signal utilizing only one costly digitizer 48 and a single costly frame buffer 22.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A system for combining first and second video signals to produce a composite video signal for display comprising:

first video generator means for providing said first video signal for each of a first plurality of pixels, second video generator means for providing said second video signal for each of a second plurality of pixels, means for comparing each pixel of said first video signal with a preselected color and generating a logic signal for each one of said first plurality of pixels indicating whether each pixel matches said preselected color, map means coupled to said comparing means for storing each of said logic signals when a field data is in a first state and for providing said logic signals on an output line thereof when said field data is in a second state, means coupled to said comparing means and said map means for selectively providing (1) a complement of said logic signals from said comparing means to a frame buffer when said field data is in said first state and (2) said logic signals from said output line of said map means to said frame buffer when said field data is in said second state, and said frame buffer selectively coupled to said first or second video signal, said frame buffer being operative to store said composite video signal which is comprised of (1) a plurality of selected pixels from said first video signal which have corresponding logic signals that indicate they do not match the preselected color and (2) a plurality of selected pixels from said second video signal which have corresponding logic signals that indicate they correspond to pixel locations of the first video signal which matched the preselected color.

2. The system according to claim 1, wherein said composite video signal is stored by said frame buffer by receiving (1) each pixel from said first video signal and its corresponding complement logic signal when said field data is in said first state and storing said selected pixels from said first video signal, and (2) each pixel from said second video signal and its corresponding logic signal when said field data is in said second state and storing said selected pixels from said second video signal.

3. The system according to claim 1, wherein said first video generator means is an analog video generator, said second video generator means is a digital video generator, said first video signal is a first analog video signal and said second video signal is a second digital video signal.

4. The system according to claim 3, wherein said digital video generator is a stored digital video generator and said second video signal is a stored digital video signal.

5. The system according to claim 4, wherein said stored digital video generator is selected from the group consisting of a CD ROM and a computer hardfile.

6. The system according to claim 3, wherein said digital video generator is a live digital video generator and said second video signal is a live digital video signal.

7. The system according to claim 3, further comprising a digitizer coupled to said video first generator means and said frame buffer for converting said first analog video signal into a first digital video signal, said frame buffer being selectively coupled to said first digital video signal or said second digital video signal.

8. The system according to claim 7, further comprising a selector coupled to an output of said digitizer and said second video generator means for selectively coupling either of said first digital video signal or said second digital video signal to said frame buffer based on said field data.

9. The system according to claim 3, wherein said second video generator means is a compressed video source for generating stored compressed digital video signals, said system further comprising a CODEC (compressor and decompressor) coupled to said compressed video source for receiving the compressed digital video signals and decompressing them into said second digital video signal.

10. The system according to claim 1, wherein said comparing means is a chroma key circuit and said map means is an input lock map.

11. The system according to claim 1, wherein said selective providing means comprises an inverter coupled to said comparing means and a selector having input lines coupled to the inverter and the map means, an output line coupled to a write select bit of the frame buffer and a control line for receiving the field data.

12. The system according to claim 1, wherein said first and second video generator means are analog video generators and said first and second video signals are first and second analog video signals respectively.

13. The system according to claim 12, further comprising converting means coupled between said first and second analog video generators and said frame buffer for selectively converting (1) said first analog video signal into a first digital video signal and (2) said second analog video signal into second digital video signal, said frame buffer being selectively coupled to said first or second digital video signal.

14. The system according to claim 13, wherein said converting means comprises:
a first selector coupled to said first and second analog video generators for selectively providing either of said first or second analog video signal on an output line thereof based on said field data, and
a video digitizer having an input coupled to said output line of said first selector and an output coupled to said frame buffer and said comparing means for converting (1) said first analog video signal into said first digital video signal and (2) said second analog video signal into said second digital video signal.

15. The system according to claim 14, wherein said selective providing means comprises an inverter coupled to said comparing means and a second selector having input lines coupled to the inverter and the map means, an output line coupled to a write select bit of the frame buffer and a control line for receiving the field data.

16. A method for combining first and second video signals to provide a composite video signal for display, comprising the steps of:
providing said first and second video signals for each of a first and second plurality of pixels respectively,
comparing each pixel of said first video signal with a preselected color and generating a logic signal for each one of said first pixels indicating whether each pixel matches said preselected color,
storing each of said logic signals in a map means when a field data is in a first state and providing said logic signals on an output line of said map means when said field data is in a second state,
selectively providing (1) a complement of said logic signals to a frame buffer when said field data is in said first state, or (2) said logic signals from said output line to said frame buffer when said field data is in said second state, and
storing in said frame buffer a plurality of selected pixels from said first video signal which have corresponding logic signals that indicate they do not match the preselected color,
storing in said frame buffer a plurality of selected pixels from said second video signal which have corresponding logic signals that indicate they correspond to pixel locations of the first video signal which matched the preselected color.

17. The method according to claim 16, wherein said step of storing a plurality of selected pixels from said first video signal in said frame buffer includes the steps of:
receiving each pixel from said first video signal and its corresponding complement logic signal when said field data is in said first state, and
storing said selected pixels from said first video signal, and said step of storing a plurality of selected pixels from said second video signal in said frame buffer includes the steps of:
receiving each pixel from said second video signal and its corresponding logic signal when said field data is in said second state, and
storing said selected pixels from said second video signal.

18. The method according to claim 16, wherein said first video signal is a live analog video signal and said second video signal is a stored digital video signal.

19. The method according to claim 18, further comprising the steps of
converting said live analog video signal into a live digital video signal,
selectively coupling said frame buffer to either of said live digital video signal or said stored digital video signal based on said field data.

20. The method according to claim 18, further including the steps of:
selecting said live analog video signal,
converting said live analog video signal into a live digital video signal for each of said first pixels,
performing said comparing step,
storing each of said logic signals in said map means,
providing said complement of said logic signals to a write select bit of said frame buffer, and
storing in said frame buffer said plurality of selected pixels from said live digital video signal.

21. The method according to claim 20, further including the steps of:
selecting said stored digital video signal,
providing said logic signals on an output line of said map means,
providing said logic signals from said output line to said write select bit of said frame buffer,
storing in said frame buffer said plurality of selected pixels from said stored digital video signal.

22. The method according to claim 18, further including the step of decompressing a compressed video signal into said stored digital video signal.

23. The method according to claim 17, wherein said first and second video signals are analog video signals.

24. The method according to claim 23, wherein said first and second analog video signals are live signals.

25. The method according to claim 23, further comprising the steps of:

selectively converting (1) said first analog video signal into a first digital video signal and (2) said second analog video signal into second digital video signal, and selectively coupling said frame buffer to either of said first or second digital video signal.

26. The method according to claim 23, further including the steps of:

selecting said first analog video signal, converting said first analog video signal into a first digital video signal for each of said first pixels, performing said comparing step, storing each of said logic signals in said map means, providing said complement of said logic signals to a write select bit of said frame buffer, and storing in said frame buffer said plurality of selected pixels from said first digital video signal.

27. The method according to claim 25, further including the steps of:

selecting said second digital video signal, providing said logic signals on an output line of said map means, providing said logic signals from said output line to said write select bit of said frame buffer, storing in said frame buffer said plurality of selected pixels from said second digital video signal.

\* \* \* \* \*